United States Patent
Jones et al.

(10) Patent No.: US 6,271,499 B1
(45) Date of Patent: Aug. 7, 2001

(54) METHOD FOR WELDING ELECTROFORMED MATERIAL TO OTHER ELECTROFORMED MATERIAL, AT LEAST ONE OF WHICH HAVING AN OPTICAL PATTERN ON A SURFACE THEREOF

(75) Inventors: Marshall Gordon Jones, Scotia, NY (US); Robert Gerard Sheldon, Woodstock, GA (US); Carl Edward Erikson, Schenectady, NY (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/395,502

(22) Filed: Sep. 14, 1999

(51) Int. Cl.$^7$ .................................................. B23K 26/00
(52) U.S. Cl. ............................... 219/121.64; 219/121.63; 219/121.65; 219/121.66
(58) Field of Search ................... 219/121.64, 121.63, 219/121.65, 121.66; 359/896

(56) References Cited

U.S. PATENT DOCUMENTS

| | | | |
|---|---|---|---|
| 4,782,209 | * 11/1988 | Caers et al. | 219/121.64 |
| 5,055,652 | * 10/1991 | Jones et al. | 219/121.64 |
| 5,123,074 | * 6/1992 | Yokota et al. | 385/95 |
| 6,108,144 | * 8/2000 | Holderer et al. | 359/819 |

* cited by examiner

Primary Examiner—M. Alexandra Elve

(57) ABSTRACT

A method for welding a first metallic material to a second metallic material where at least one of the first and second metallic materials have at least one surface which has an optical pattern thereon. The method comprises the steps of: arranging the first and second metallic materials into a final position in which they will be welded along a joint; directing focused energy at the joint from a Nd-YAG pulsed laser having an energy output in a range from about 10 Joules to about 30 Joules and a pulse length in a range from about 5 ms to about 9 ms; and traversing the joint at a predetermined welding speed while directing the focused energy such that a weld spot overlap in a range from about 50% to about 90% is maintained, resulting in a welded joint wherein a heat effect zone about the welded joint is minimized further resulting in minimal distortion and damage to an area of the optical pattern proximate to the welded joint. Also provided is a method for repairing any weld defects in the welded joint with the same Nd-YAG pulsed laser.

20 Claims, 5 Drawing Sheets

METHOD FOR WELDING ELECTROFORMED MATERIAL TO OTHER ELECTROFORMED MATERIAL, AT LEAST ONE OF WHICH HAVING AN OPTICAL PATTERN ON A SURFACE THEREOF

BACKGROUND OF THE INVENTION

1. Field of the Invention

The present invention relates generally to a method for welding first and second metallic materials one of which having a surface with an optical pattern disposed thereon and, more particularly, to a method for welding first and second electroformed materials each having the optical pattern on at least one surface thereof while minimizing distortion and damage to the optical patterns as a result of the weld.

2. Prior Art

It is well known that many nickel-based alloys can be joined by a host of welding techniques including arc, solid state, electron-beam and laser beam. When it is required to maintain certain properties after the welding process, the proper choice of welding processes are limited. The following properties and geometric considerations are important when addressing the functionality of certain optical and structural components. In addition to minimizing overall component thermal distortions, an important structural consideration is the retention of the materials original metallurgical and mechanical properties such as those which correlate with fine grain structure, formability and low cycle fatigue. Fine grains will grow when subjected to extended levels of high temperature as might be experienced in a furnace, improperly cooled machining procedures, and high heat input welding processes.

To assure a trouble free final assembly process of complex hardware, it is good design practice to maintain geometric dimensions and tolerances of multiple components and subassemblies. This may be a potential problem when components and/or subassemblies require one or more welding procedures. Welding procedures can readily cause distortions in the components and/or subassemblies, such as warping of the components. Such distortions can result in dimensions and tolerances that do not meet specifications. This problem can be amplified if the component parts have residual stresses present resulting from a forming process or from unfavorable concentration of alloy constituents.

In addition to structural and geometric considerations, the surfaces of these component parts may be optically finished and may ultimately be coated. The welding process and any warping associated therewith cannot be tolerated because it disturbs the optical finish of the welded components and thus compromises the integrity of the optical finish or effects the material in ways which may preclude any subsequent coating process. The optical finish of the surfaces is the critical quality attribute when considering end use functionality.

SUMMARY OF THE INVENTION

Therefore it is an object of the present invention to provide a low heat input welding procedure which would minimize warping and other thermal distortion effects, limit grain growth to the weld, and minimize the size of a heat affected zone (HAZ) caused by the weld.

An additional objective of this invention is to effect a seam weld of optical components without compromising the integrity of any existing or to be applied optical coating. To optimize the functionality of the final hardware, it is important to maintain the desired optical quality of surfaces and any coatings as close to the resulting weld seams as possible.

Accordingly, a method is provided for welding a first metallic material to a second metallic material wherein at least one of the first and second metallic materials have at least one surface with an optical pattern thereon. The method comprising the steps of: arranging the first and second metallic materials into a final position in which they will be welded along a joint; directing focused energy at the joint from a neodymium: yttrium-aluminum-garnet (Nd-YAG) pulsed laser having an energy output in a range from about 10 Joules to about 30 Joules and a pulse length in a range from about 5 ms to about 9 ms; and traversing the joint at a predetermined welding speed while directing the focused energy such that a weld spot overlap in a range from about 50% to about 90% is maintained, resulting in a welded joint wherein a heat effect zone about the welded joint is minimized further resulting in minimal distortion and damage to an area of the optical pattern proximate to the welded joint.

In a preferred implementation of the method of the present invention at least one of the first and second materials comprises a composite having a substrate sandwiched by first and second metallic layers, at least one, and preferably both of the first and second metallic layers having the surface with the optical pattern thereon.

In an alternative version of the method of the present invention, the method further comprises the step of repairing a weld defect in the welded joint, wherein the repairing step comprises the sub-steps of: filling the weld defect with a filler material; directing focused energy at the weld defect from a second laser; and traversing the weld defect while directing the focused energy. Preferably, the second laser is the Nd-YAG pulsed laser.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Although this invention is applicable to numerous and various types of materials having an optical pattern on at least one side thereof, it has been found particularly useful in the environment of electroformed optical materials, particularly those that are nickel based. Therefore, without limiting the applicability of the invention to electroformed optical materials or nickel based alloys, the invention will be described in such environment.

Figure 1:
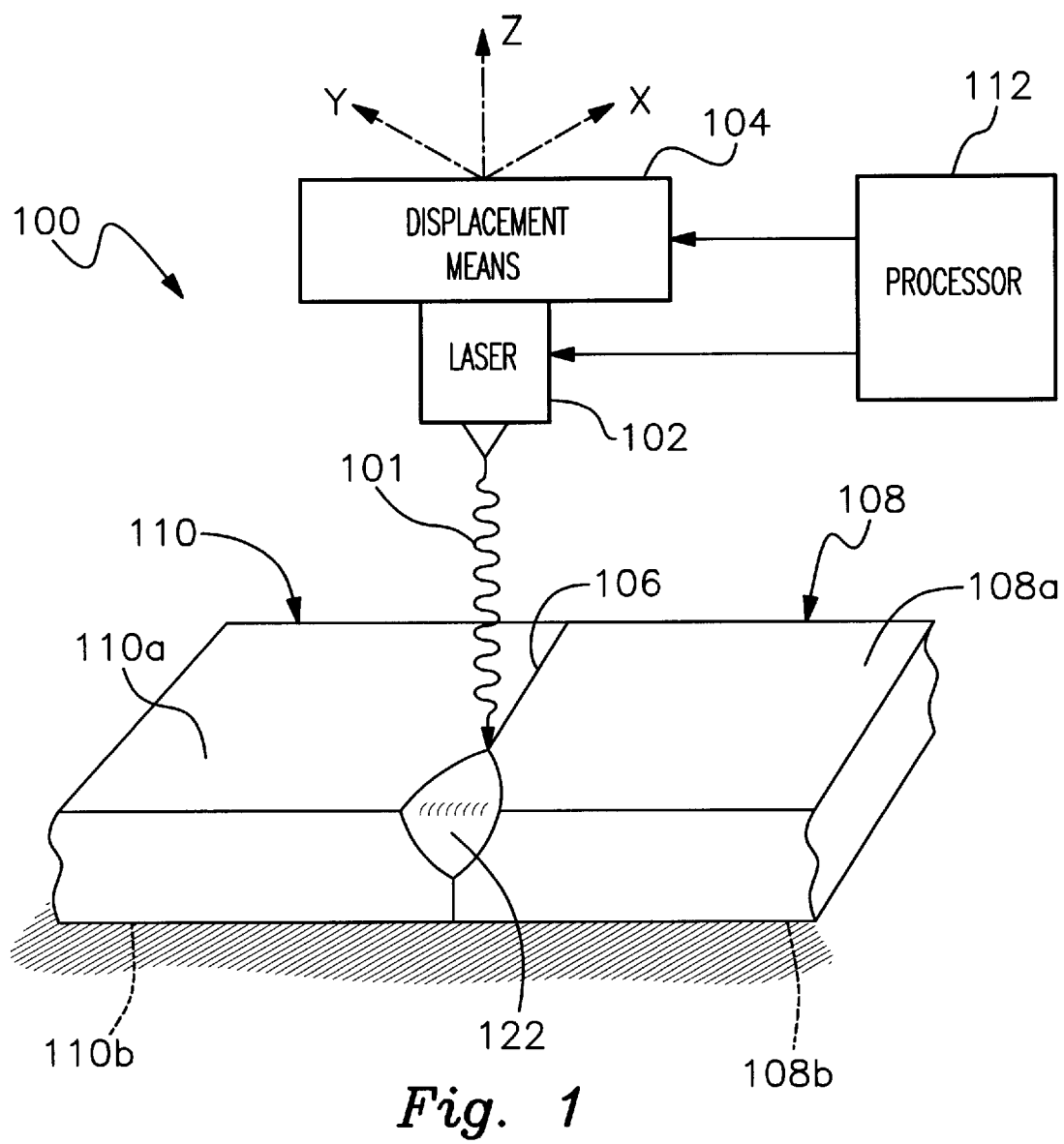
FIG. 1 illustrates an apparatus for carrying out the welding methods of the present invention.

Referring now to FIG. 1, there is illustrated an apparatus for effecting the methods of the present invention, generally referred to by reference numeral 100. The apparatus 100 comprises a laser 102 coupled to a displacement means 104 for displacement of the laser 102 along a joint 106 to be welded. The joint represents the coincidence of an edge and/or surface of first and second metallic materials 108, 110 to be welded. At least one of surfaces 108a, 110a has an optical pattern disposed thereon, and preferably both surfaces have the optical pattern disposed thereon 108b, 110b.

The displacement means preferably is capable of movement in three directions (X, Y, Z) (i.e., three degrees of freedom) and is preferably under the control of a processor 112 which controls the displacement means 104 such that the laser traverses the joint 106 at a predetermined speed. Displacement means of this type are well known in the art and therefore a detailed description of it is omitted for brevity. The apparatus 100 may also include a vision system (not shown) which maps the joint 106 and feeds the map data into the processor 112 which inputs displacement means 104 to direct the laser at the joint 106 at the required speed. The processor 112 also preferably controls the laser 102 to pulse at the required power and duration (pulse length) according to the type of weld joint and the types of materials to be welded. Alternatively, the first and second materials may move relative to the laser 102.

The method for welding the first metallic material 108 to the second metallic material 110 (or to a substrate, discussed below) along the weld joint 106 comprises first arranging the first and second metallic materials 108, 110 into a final position in which they will be welded along the joint 106. Next, focused energy 101 from the laser 102 is directed at the joint 106. Preferably a Nd-YAG pulsed laser is used having an energy output in a range from about 10 Joules to about 30 Joules and a pulse length in a range from about 5 ms to about 9 ms. The laser 102 can alternatively by a Nd:glass laser, however, the welding speed would be considerably slower. Lastly, the joint 106 is traversed by means of the displacement means 104 under the control of the processor 104 at a predetermined welding speed while directing the focused energy such that a weld spot overlap in a range from about 50% to about 90% is maintained, resulting in a welded joint 122 wherein a heat effect zone about the welded joint 122 is minimized and further resulting in minimal distortion and damage to an area of the optical pattern proximate to the welded joint.

Figure 2:
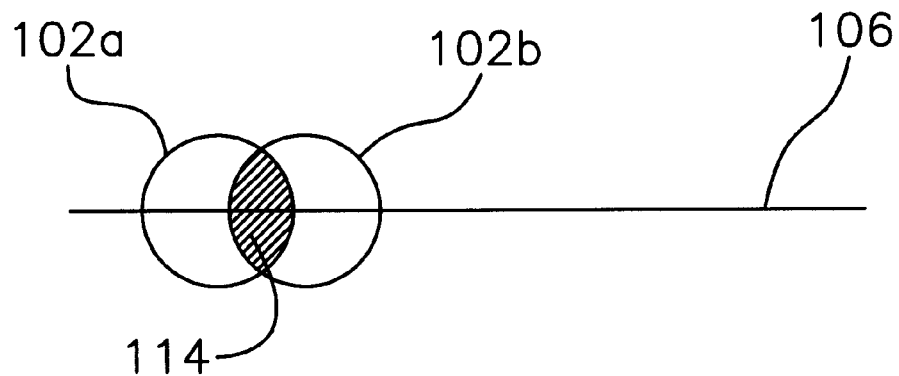
FIG. 2 illustrates the spot overlap from the laser of FIG. 1.

FIG. 2 illustrates the weld spot overlap 114 of a first weld spot 102a at time $t_0$ and the next weld spot 102b occurring at a subsequent time $t_1$ The weld spot overlap 114 is represented as a percentage of the area that two weld spots overlap as compared to the area of a weld spot.

Figure 3:
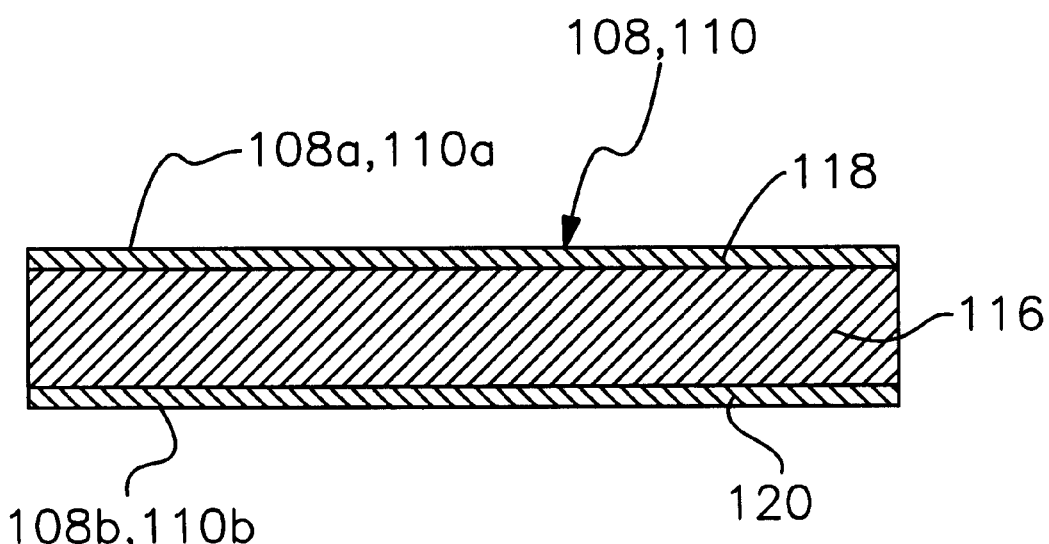
FIG. 3 illustrates a composite material to be welded according to the welding methods of the present invention.
Figure 4:
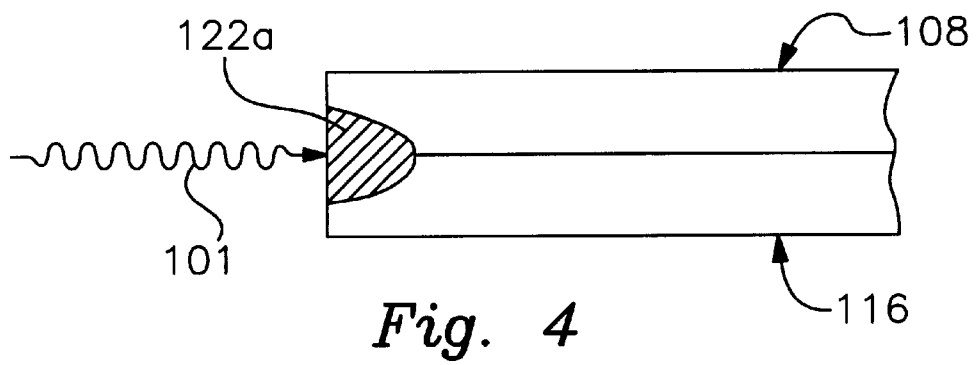
FIG. 4 illustrates an edge weld type of weld joint which can be welded by the welding methods of the present invention.
Figure 5:
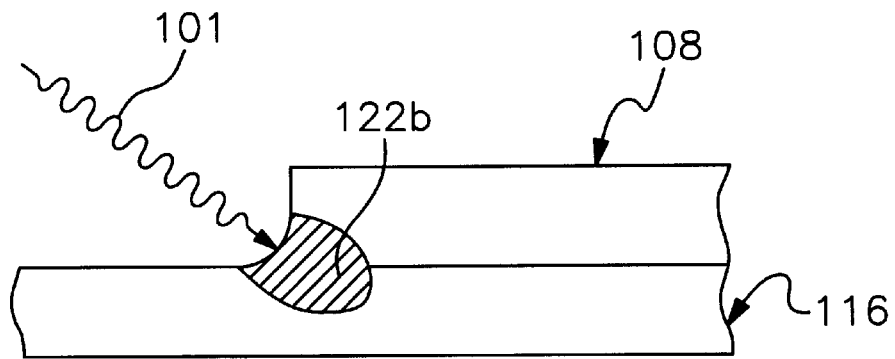
FIG. 5 illustrates a lap weld type of weld joint which can be welded by the welding methods of the present invention.
Figure 6:
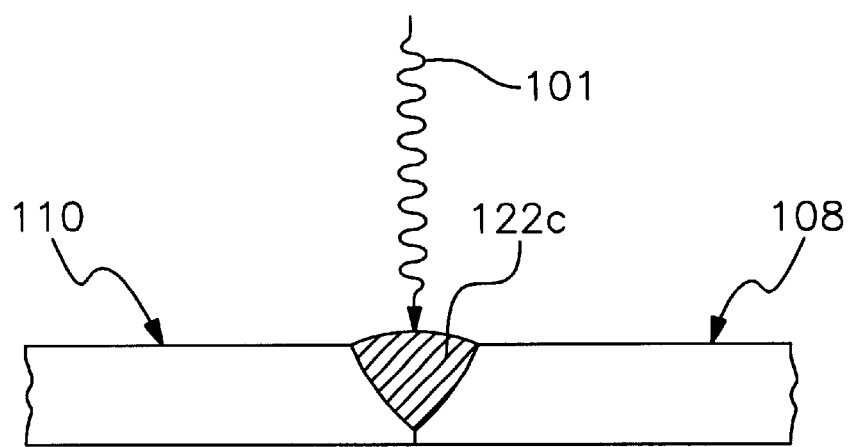
FIG. 6 illustrates a planar butt weld type of weld joint which can be welded by the welding methods of the present invention.
Figure 7:
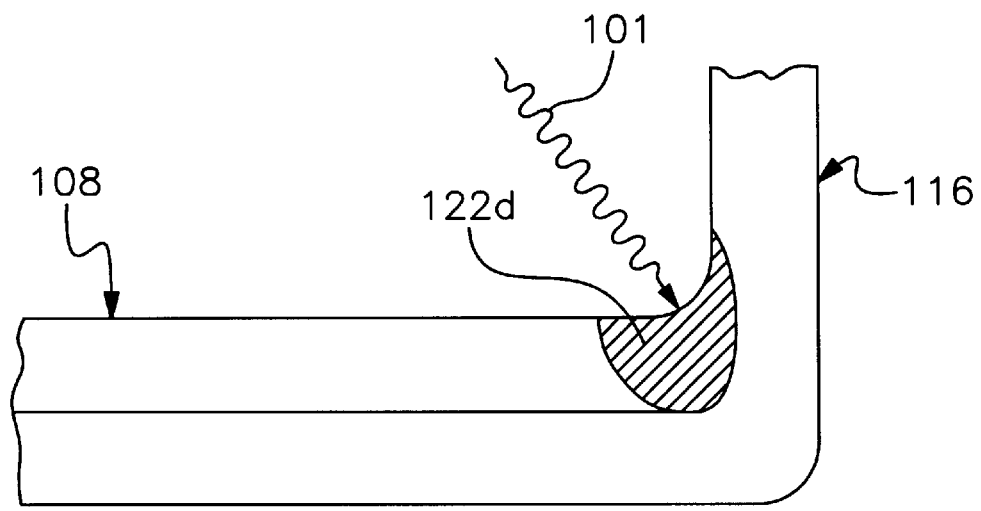
FIG. 7 illustrates a non-planar butt weld type of weld joint which can be welded by the welding methods of the present invention.

At least one of the first and second materials 108, 110 is preferably in the form of a composite, as illustrated in FIG. 3. The composite comprises a substrate 116, preferably, a nickel-iron-chromium alloy, such as Inconel®, sandwiched by first and second metallic layers 118, 120. At least one, and preferably both of the first and second metallic layers 118, 120 have a surface which has the optical pattern thereon 108a, 108b, 110a, 110b. The first and second metallic layers 118, 120 are preferably electroformed layers having a thickness in a range from about 0.2 mm to about 2.0 mm wherein electroforming is the shaping of first and/or second metallic layers by electrodeposition. The first and second electroformed metallic layers 118, 120 are preferably nickel or cobalt or alloys thereof.

Figure 8:
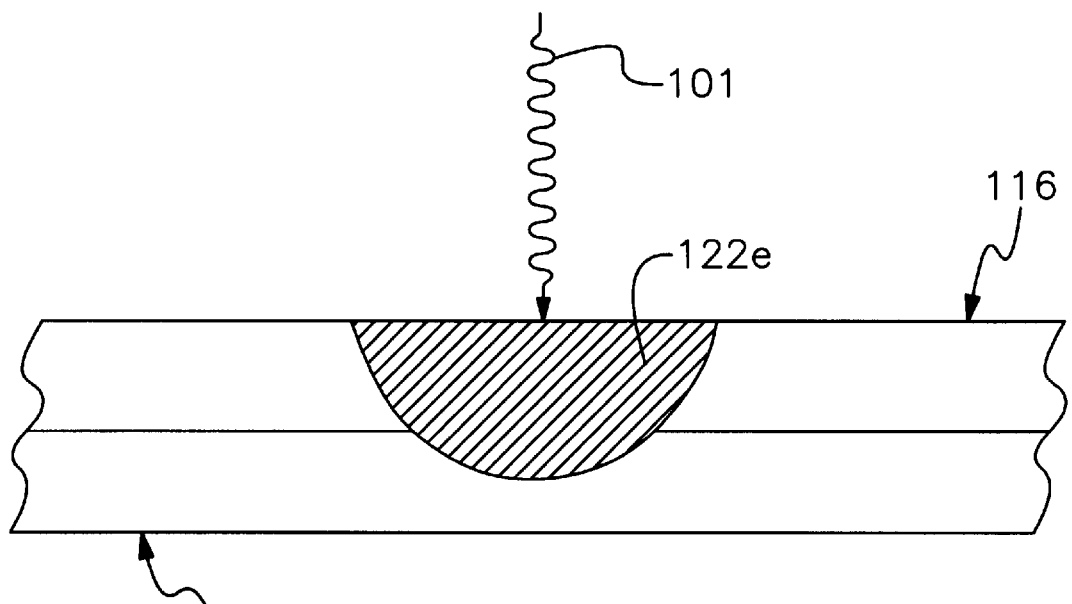
FIG. 8 illustrates a full penetration weld type of weld joint which can be welded by the welding methods of the present invention.

Typically, the type of weld joints that require welding include the following, illustrated in FIGS. 4–8: welding a metallic layer 108 to the substrate 116 along an edge weld joint 122a (FIG. 4); welding a metallic layer 108 to the substrate 116 along a lap/fillet weld joint 122b (FIG. 5); welding the first metallic layer 108 to the second metallic layer 110 along a planar butt weld joint 122c (FIG. 6); welding a metallic layer 108 to the substrate 116 along a non-planar butt weld joint 122d (FIG. 7); and welding a metallic layer 108 to the substrate 116 along a full penetration weld joint 122e (FIG. 8). As is evident from FIGS. 4–8, some of the weld types require more penetration than others to form a satisfactory weld, both structurally and hermetically. The edge weld generally requires the least weld penetration of the weld types illustrated and the full penetration weld requiring the most. Generally, the pulse length, spot overlap, and energy output of the laser 102 are increased to the upper limit of their ranges as the amount of weld penetration needed to satisfactorily produce the welded joint increases.

It is apparent to someone skilled in the art that the energy output of the laser 102 must also be increased to compensate for the high surface reflectivity of the optically patterned (and highly polished) surfaces. It is also apparent to those skilled in the art that the above energy output levels depend on whether there is good fit-up between the materials that are being welded. The aforementioned laser parameters translate into welding speeds of 10–15 inches/min. for a commercial 400–500 W pulsed Nd:YAG laser. Nd:YAG lasers are commercially available from companies such as LASAG, HAAA, and GSI Lumonics.

Similarly, the pulse length, spot overlap, and energy output of the laser 102 are increased to the upper limit of their ranges as the thickness of the materials to be welded increases.

Figure 9:
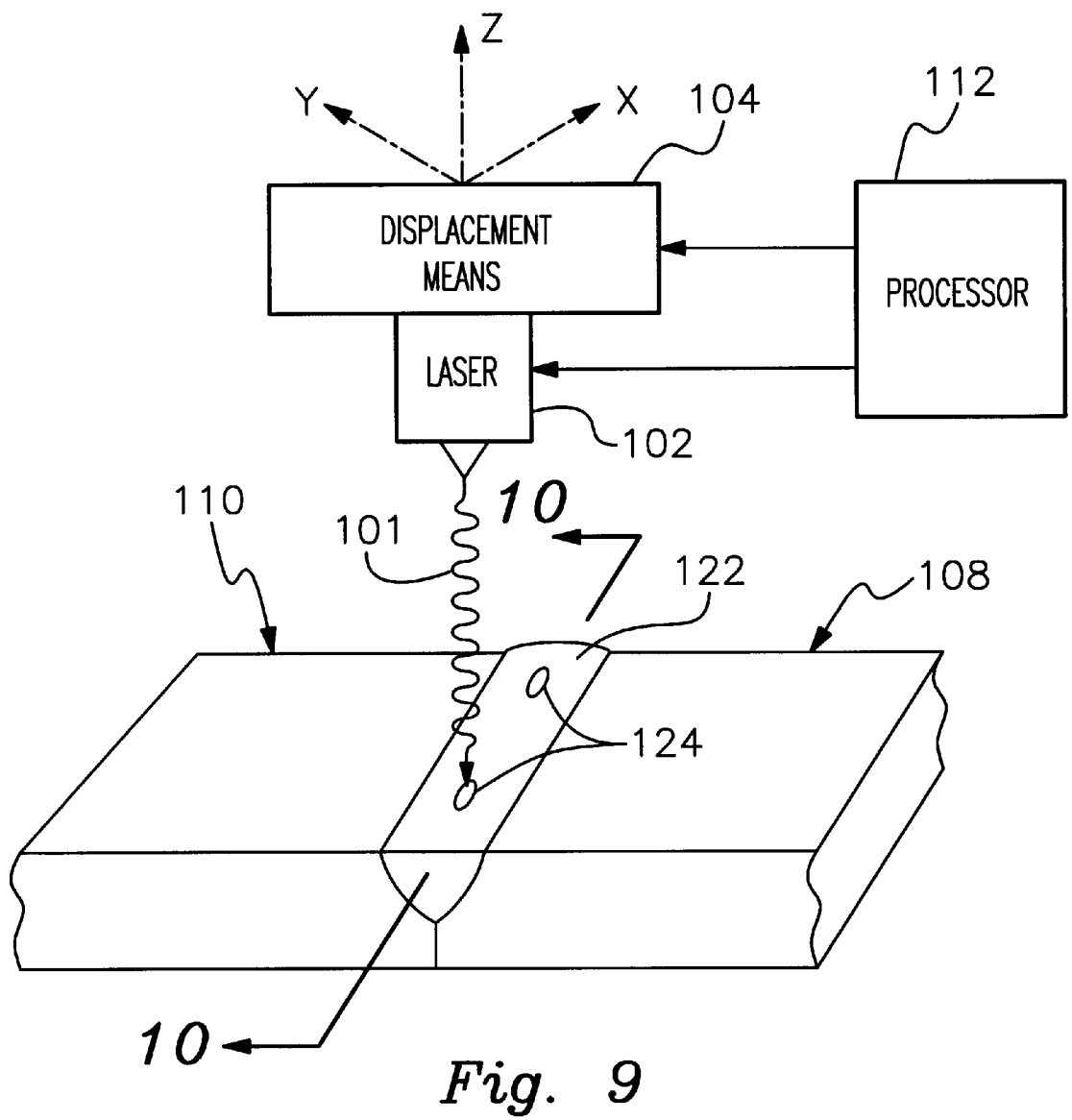
FIG. 9 illustrates a variation of the welding methods of the present invention for use in repairing defects in a welded joint.
Figure 10:
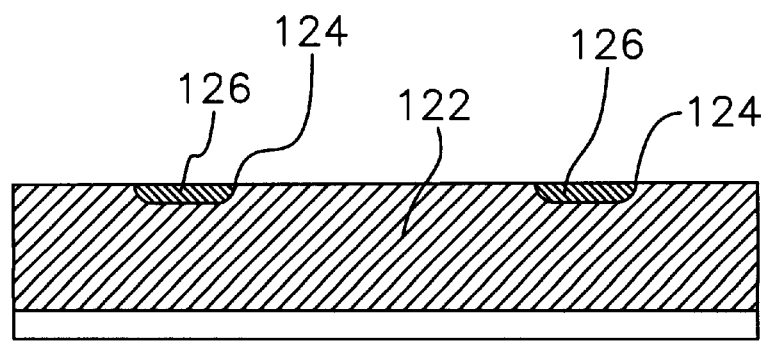
FIG. 10 illustrates a sectional view of the welded joint of FIG. 9 taken along line 10—10.

Referring now to FIGS. 9 and 10, there is shown the apparatus of FIG. 1 used to repair an already welded joint 122 having defects 124. Repairs are generally required because of poor fit-ups of portions of the mating first and second materials. The repair method comprises the first step of filling the weld defects 124 with a filler material 126 such as those commercially available in the art. Next, focused energy from the laser 102 is directed at the weld defects 124 from the laser 102, which is preferably the same laser as in apparatus 100. However, a second laser can be utilized. The weld defects 124 are then traversed while directing the focused energy at them by the laser 102 to affect the repair. As discussed above, the laser is preferably under the control of the processor 112 and may include a vision system which maps the weld defects 124 and feeds the map data into the processor 112 which controls the displacement means 104 to direct the laser at the weld defects 124 at the required speed and also controls the laser to pulse at the required power and duration.

Thus, the methods disclosed herein minimize thermal distortions such as warping, limit grain growth, and minimize the size of the HAZ when welding an optical quality nickel-based electroform material to other nickel-based electroformed material and other nickel-based alloys. The methods of the present invention also do not adversely effect the finish of the optical component near (to much heat) or afar (possible weld spatter) from the weld seam. Furthermore, the methods of the present invention do not affect the ability to apply subsequent optical coatings or damage pre-existing coatings in areas other than that of the immediate weld.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for welding a first metallic material to a second metallic material, at least one of the first and second metallic materials having at least one surface having an optical pattern thereon, the method comprising the steps of:
   arranging the first and second metallic materials into a final position in which they will be welded along a joint;
   directing focused energy at the joint from a pulsed laser having an energy output in a range from about 10 Joules to about 30 Joules and a pulse length in a range from about 5 ms to about 9 ms; and
   traversing the joint at a predetermined welding speed while directing the focused energy such that a weld spot overlap in a range from about 50% to about 90% is maintained, resulting in a welded joint wherein a heat effect zone about the welded joint is minimized further resulting in minimal distortion and damage to an area of the optical pattern proximate to the welded joint.

2. The method of claim 1, wherein at least one of the first and second materials comprises a composite having a substrate sandwiched by first and second metallic layers, at least one of the first and second metallic layers having the surface having the optical pattern thereon.

3. The method of claim 2, wherein each of the first and second metallic layers have the optical pattern on a surface thereof.

4. The method of claim 2, wherein the substrate is a nickel-iron-chromium alloy.

5. The method of claim 2, wherein at least one of the first and second metallic layers being an electroformed material.

6. The method of claim 5, wherein each of the first and second metallic layers are an electroformed material.

7. The method of claim 5, wherein the at least one first and second electroformed metallic layer has a thickness in a range from about 0.2 mm to about 2.0 mm.

8. The method of claim 5, wherein the at least one first and second electroformed metallic layer is nickel or an alloy thereof.

9. The method of claim 5, wherein the at least one first and second electroformed metallic layer is cobalt or an alloy thereof.

10. The method of claim 7, further comprising the step of increasing the pulse length to the upper limit of its range as the thickness increases to the upper limit of its range.

11. The method of claim 7, further comprising the step of increasing the spot overlap to the upper limit of its range as the thickness increases to the upper limit of its range.

12. The method of claim 7, further comprising the step of increasing the energy output of the pulsed laser to the upper limit of its range as the thickness increases to the upper limit of its range.

13. The method of claim 1, wherein the weld requires an amount of weld penetration to satisfactorily produce the welded joint, the method further comprising the step of increasing the pulse length to the upper limit of its range as the amount of required weld penetration increases.

14. The method of claim 1, wherein the weld requires an amount of weld penetration to satisfactorily produce the welded joint, the method further comprising the step of increasing the spot overlap to the upper limit of its range as the required amount of weld penetration increases.

15. The method of claim 1, wherein the weld requires an amount of weld penetration to satisfactorily produce the welded joint, the method further comprising the step of increasing the energy output of the pulsed laser to the upper limit of its range as the required amount of weld penetration increases.

16. The method of claim 1, wherein the predetermined welding speed is in a range from about 10 inches/minute to about 15 inches/minute.

17. The method of claim 1, further comprising the step of repairing a weld defect in the welded joint, wherein the repairing step comprises the sub-steps of:
   filling the weld defect with a filler material;
   directing focused energy at the weld defect from a second laser; and
   traversing the weld defect while directing the focused energy.

18. The method of claim 17, wherein the second laser is the pulsed laser.

19. The method of claim 1, wherein the pulsed laser is a Nd:YAG laser.

20. The method of claim 1, wherein the pulsed laser is a Nd:glass laser.

* * * * *